United States Patent
Canonico

(10) Patent No.: US 7,201,080 B1
(45) Date of Patent: Apr. 10, 2007

(54) HAND-OPERATED JOINTED CONTROL LEVER

(75) Inventor: Stephen H. Canonico, Abingdon, VA (US)

(73) Assignee: Appalachian Cast Products, Inc., Abingdon, VA (US)

( * ) Notice: Subject to any disclaimer, the term of this patent is extended or adjusted under 35 U.S.C. 154(b) by 572 days.

(21) Appl. No.: 10/690,147

(22) Filed: Oct. 21, 2003

Related U.S. Application Data

(60) Provisional application No. 60/419,981, filed on Oct. 21, 2002.

(51) Int. Cl.
*G05G 1/04* (2006.01)

(52) U.S. Cl. ......................... 74/502.2; 74/489

(58) Field of Classification Search ............... 188/2 D; 74/489, 501, 523, 524, 525, 527, 529, 543, 74/547, 502.2
See application file for complete search history.

(56) References Cited

U.S. PATENT DOCUMENTS

| | | | | |
|---|---|---|---|---|
| 2,800,798 | A | * | 7/1957 | Korsmo ...................... 74/102 |
| 2,854,857 | A | * | 10/1958 | Gleasman et al. ............ 74/489 |
| 3,940,165 | A | * | 2/1976 | Sogoian ...................... 280/851 |
| 4,088,040 | A | * | 5/1978 | Ross-Myring ............. 74/501.6 |
| 4,726,252 | A | | 2/1988 | Dawson |
| 4,730,509 | A | | 3/1988 | Hornady |
| 5,954,161 | A | | 9/1999 | Lee |
| 6,047,611 | A | | 4/2000 | Warren, deceased et al. |
| 6,393,933 | B2 | | 5/2002 | Shirayanagi |
| 6,393,936 | B1 | | 5/2002 | Barnett |
| 6,516,682 | B2 | * | 2/2003 | Brainard .................... 74/502.2 |

OTHER PUBLICATIONS

"Bob's Cycle & Snowmobile Supply Lever ASV Clutch Hydrlc (sic)" found at internet URL http://www.cpostores.com/bobcycle/browse. cfm/4,44724,1,39.2310.html (date unknown).
"ASV Inventions Clutch Lever" found at internet URL http://www.motoworldracing.com/asv_lever.html (date unknown).
"Arcx Folding Lever-Just Like Sebastian Uses" found at URL http://www.arclevers.com/tests/arclevers.html (Apr. and May, 2000).

* cited by examiner

*Primary Examiner*—Richard M. Lorence
*Assistant Examiner*—Derek D. Knight
(74) *Attorney, Agent, or Firm*—Walker, McKenzie & Walker, P.C.

(57) ABSTRACT

A hand-operated jointed control lever assembly that allows normal operation when moved in a first direction by an operator's grip, but disjoints without breaking when moved in other directions. The control lever naturally returns to its normal mode of operation when the abnormal stressing forces of an accident or fall are removed from the lever. The lever assembly has a lever body and a lever arm with respective mating fulcrum surfaces and a tensioning cable passing through the fulcrum surfaces, with a tensioning spring exerting force on the tensioning cable to draw the fulcrum surfaces together. The lever body has a rearwardly-extending lip in engagement with a forward edge of the lever arm, allowing side-to-side disjointed movement and outward disjointed movement opposite the first direction.

2 Claims, 5 Drawing Sheets

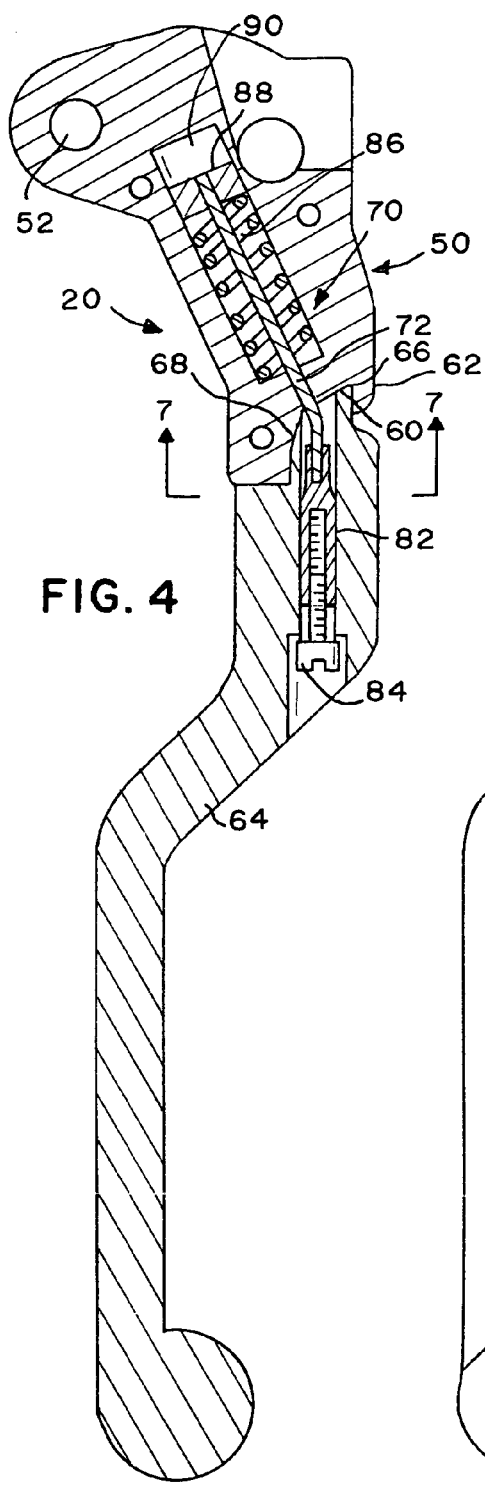
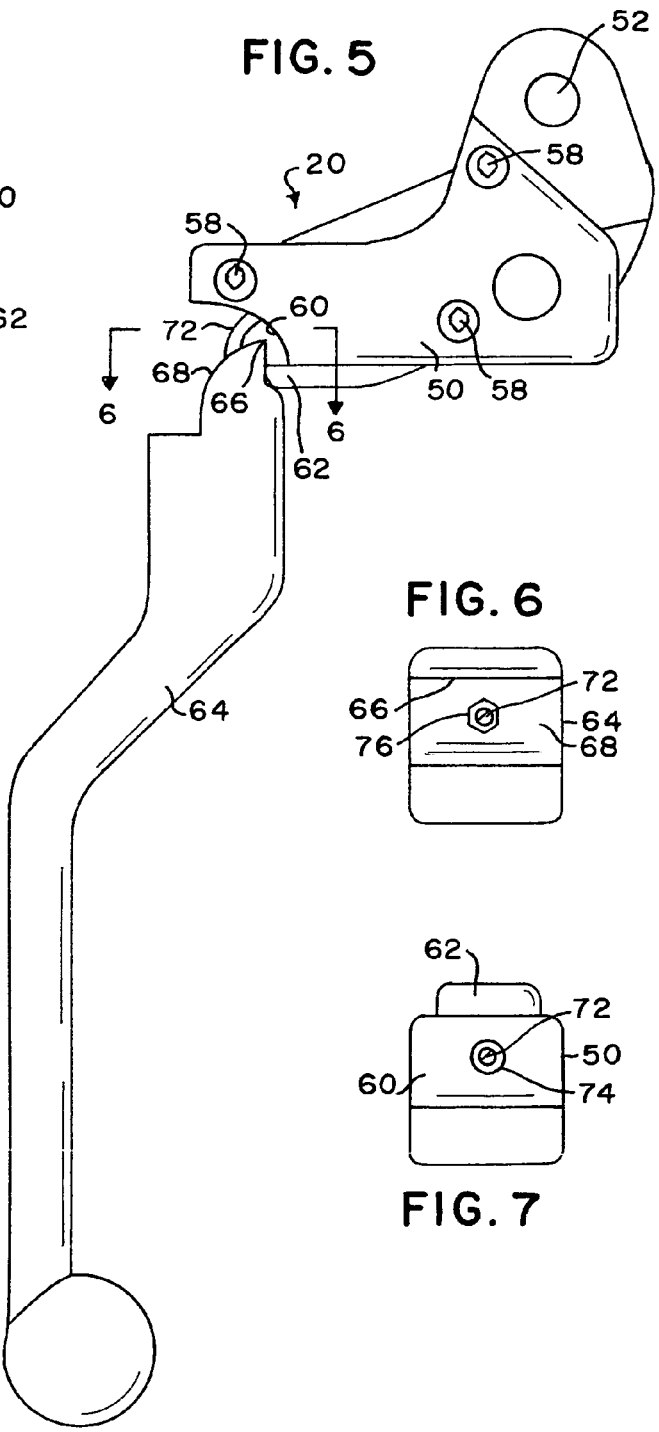
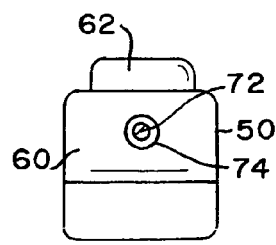
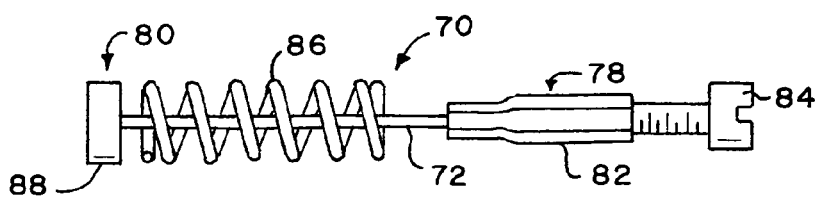

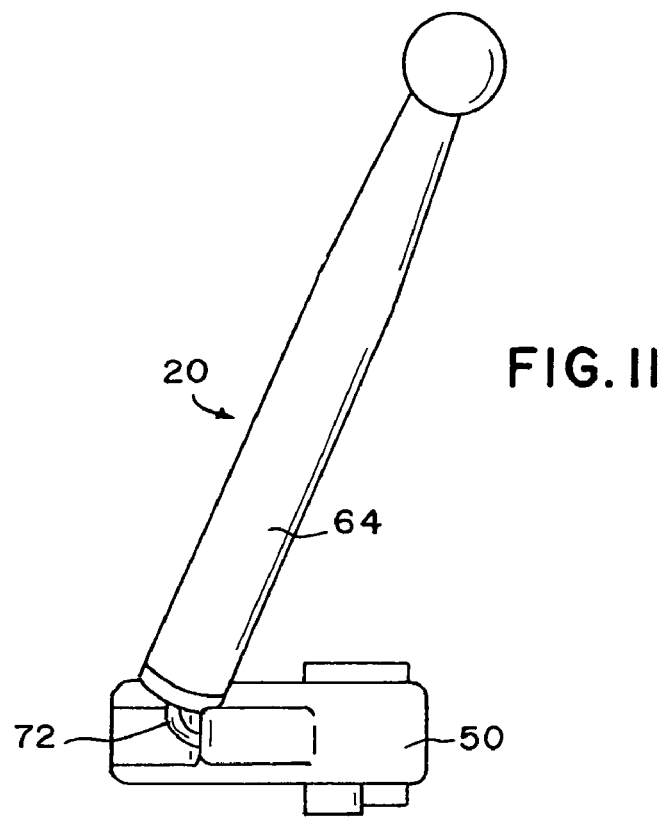
FIG. 11
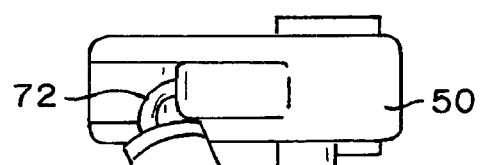
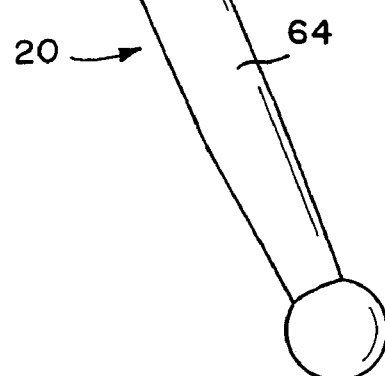
FIG. 12

HAND-OPERATED JOINTED CONTROL LEVER

CROSS REFERENCE TO RELATED APPLICATIONS

This application is a non-provisional application claiming priority of pending U.S. provisional application No. 60/419,981 (filed Oct. 21, 2002) entitled "Control Lever—Jointed to Prevent Breakage," fully incorporated herein by reference.

REFERENCE TO COMPACT DISC(S)

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates, in general, to hand-operated control levers for engaging and disengaging an apparatus, and in particular, to a hand-operated control lever that engages and releases a linkage when operated in a first direction, but that becomes disjointed to prevent breakage when forced to move in other directions.

2. Description of Related Art

Hand-operated control lever mechanisms are well-known known for use on vehicles such as motorcycles, bicycles, all-terrain vehicles, and the like, so as to operate a clutch or a brake, etc. However, prior art levers are prone to breakage in the event of an accident or when the vehicle falls over, and the broken lever can seriously maim the rider when broken metal edges lacerate the riders hands, limbs, and torso.

It is therefore desirable to have an improved control lever that allows normal operation when moved in a first direction by the operator's grip, but that releases without breaking when moved in other directions. It is further desirable that the control lever naturally return to its normal mode of operation when the abnormal stressing forces of an accident or fall are removed from the lever. It is still further desirable that the control lever not engage its linkage mechanism when moved in directions other than the normal direction of operation.

A preliminary patentability search in Class 74, Subclasses 23, 502.2, 501.6 and 489, and also using text searching on the Patent and Trademark Office EAST database system, produced the following patents, some of which may be relevant to the present invention: Ross-Myring, U.S. Pat. No. 4,088,040 (issued May 9, 1978); Lee, U.S. Pat. No. 5,954,161 (issued Sep. 21, 1999); Shirayanagi, U.S. Pat. No. 6,393,933 (issued May 28, 2002); and Brainard, U.S. Pat. No. 6,516,682 (issued Feb. 11, 2003).

The inventor is also aware of the following prior art: Dawson, U.S. Pat. No. 4,726,252 (issued Feb. 23, 1988); Hornady, U.S. Pat. No. 4,730,509 (issued Mar. 15, 1988); Warren et al., U.S. Pat. No. 6,047,611 (issued Apr. 11, 2000); and Barnett, U.S. Pat. No. 6,393,936 (issued May 28, 2002).

Ross-Myring, U.S. Pat. No. 4,088,040 (issued May 9, 1978), discloses a control lever that disjointingly pivots about a circumferential surfaces of a circular pivot ring (see FIGS. 2–7). The handle pivots in all directions and is retained to its mounting by the actuating cable. A disadvantage of the lever disclosed in the Ross-Myrig is that it actuates the cable operated by the lever when the lever is pivoted in any direction.

Lee, U.S. Pat. No. 5,954,161 (issued Sep. 21, 1999), discloses a control lever that pivots in a single plane about an arcuate surface, but the lever does not allow sidewardly disjointed pivoting.

Shirayanagi, U.S. Pat. No. 6,393,933 (issued May 28, 2002), discloses a control lever that pivots sidewardly and in and out, but the pivoting is about fixed axles without becoming disjointed.

Brainard, U.S. Pat. No. 6,516,682 (issued Feb. 11, 2003), discloses a pivoting lever but, like older levers, pivots about an axle pin in a single plane rather than becoming disjointed.

Dawson, U.S. Pat. No. 4,726,252 (issued Feb. 23, 1988), discloses a lever arm that pivots about dual axle pins but does not become disjointed.

Hornady, U.S. Pat. No. 4,730,509 (issued Mar. 15, 1988), discloses a break-away control lever that is pivoted on a two-pronged fork about fixed axle pivot pins and becomes dislocated when forced out of its direction of normal motion.

Warren et al., U.S. Pat. No. 6,047,611 (issued Apr. 11, 2000), discloses multi-pivoted lever that pivots in multiple planes. However, like other references, it pivots about a plurality of fixed pivot axle pins.

Barnett, U.S. Pat. No. 6,393,936 (issued May 28, 2002), discloses a handle that pivots about a fixed pivot pin axle in one plane.

Additionally, the inventor is aware of some advertisements for so-called "unbreakable" clutch levers from searching the internet: "Bob's Cycle & Smowmobile Supply Lever ASV Clutch Hydric [sic]," found on the internet at www.c-postores.com/bobscyle/browse.cfm/4,44724,1,39,2310.html (date unknown), and "ASV Inventions Clutch Level," found on the internet at www.motoworldracng.com/asv_lever.html (date unknown), both disclose a pivoting lever that pivots outward. The lever pivots about a fixed pivot pin in one plane only and not side-to-side. Another advertisement, "Arcx Folding Lever—Just Like Sebastian Uses," found on the internet at www.arclevers.com/tests/arclevers.html (April and May, 2000), discloses a double-jointed lever that can pivot outwardly but not sidewardly, and does not appear to disjoint about an arcuate fulcrum surface.

None of these references, either singly or in combination, disclose or suggest the present invention.

BRIEF SUMMARY OF THE INVENTION

The present invention is a hand-operated control lever that operates normally and engages and releases a linkage when moved in a first arcuate direction, but that becomes disjointed when forced side-to-side or outwardly in the reverse of the first arcuate direction.

It is an object of the present invention to provide an improved hand-operated control lever that allows normal operation when moved in a first direction by the operator's grip, but that releases without breaking when moved in other directions. It is another object of the present invention that the control lever naturally return to its normal mode of operation when the abnormal stressing forces of an accident or fall are removed from the lever. Still another object of the present invention is that the control lever not engage its linkage mechanism when moved in directions other than the normal direction of operation.

BRIEF DESCRIPTION OF THE SEVERAL VIEWS OF THE DRAWING

FIG. 4 is a longitudinal sectional view of the invention shown removed from the mounting bracket.

FIG. 5 is a side view of the present invention with the lever arm shown disjointed from the lever body and pivoted outwardly away from the handlebar.

FIG. 6 is a view of the front end of the lever arm showing the second fulcrum surface, taken substantially from a view position of line 6—6 shown in FIG. 5.

FIG. 7 is a view of the rear end of the lever body showing the first fulcrum surface, taken substantially from a view position of line 7—7 shown in FIG. 4.

FIG. 8 is a side view of the tensioning spring and cable assembly with tensioning adjustment screw.

FIG. 11 is a top view of the present invention, similar to FIG. 10 but with the lever assembly being disjointed toward a first side.

FIG. 12 is a top view of the present invention, similar to FIG. 11 but with the lever assembly being disjointed toward a second side.

DETAILED DESCRIPTION OF THE INVENTION

Figure 1:
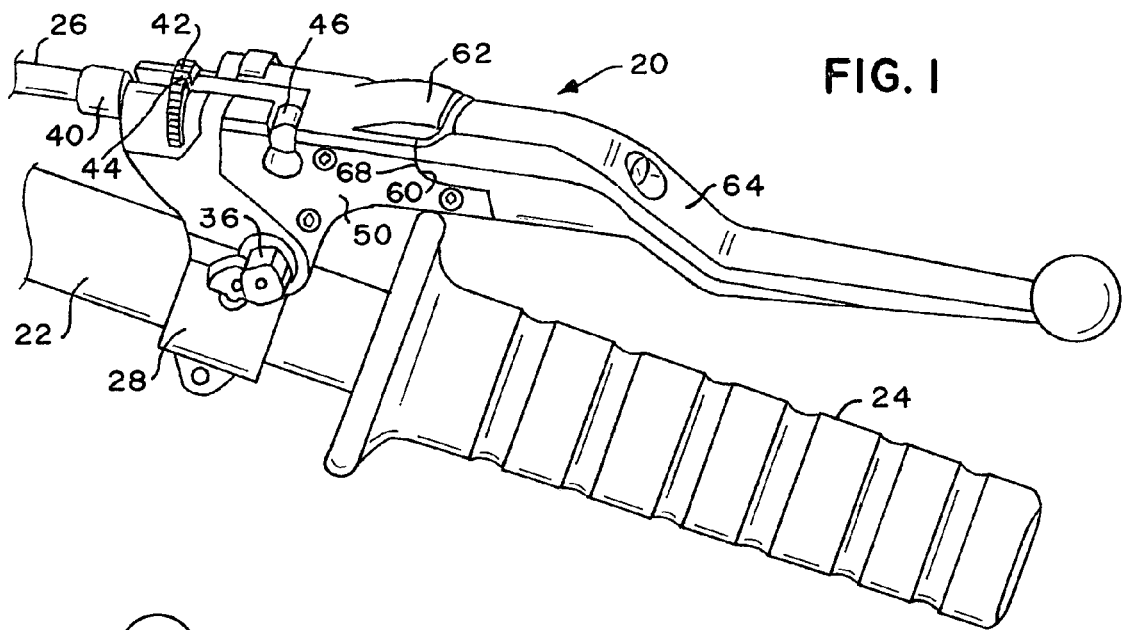
FIG. 1 is a perspective view of the present invention shown attached to a handlebar of a vehicle.
Figure 2:
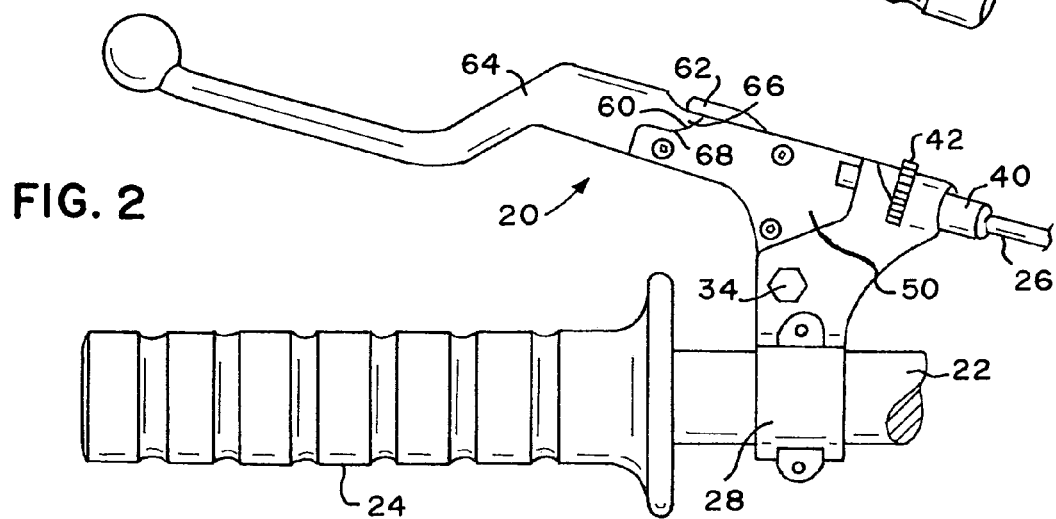
FIG. 2 is a side view of the present invention shown attached to a handlebar of a vehicle, with the lever in the released position.
Figure 3:
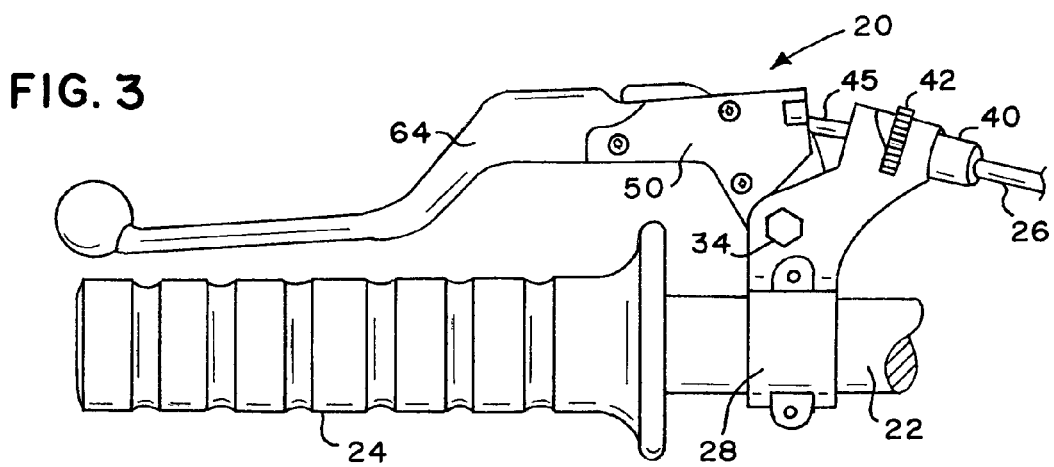
FIG. 3 is a side view of the present invention, similar to FIG. 2 except with the lever assembly shown pivoted toward the handlebar.
Figure 9:
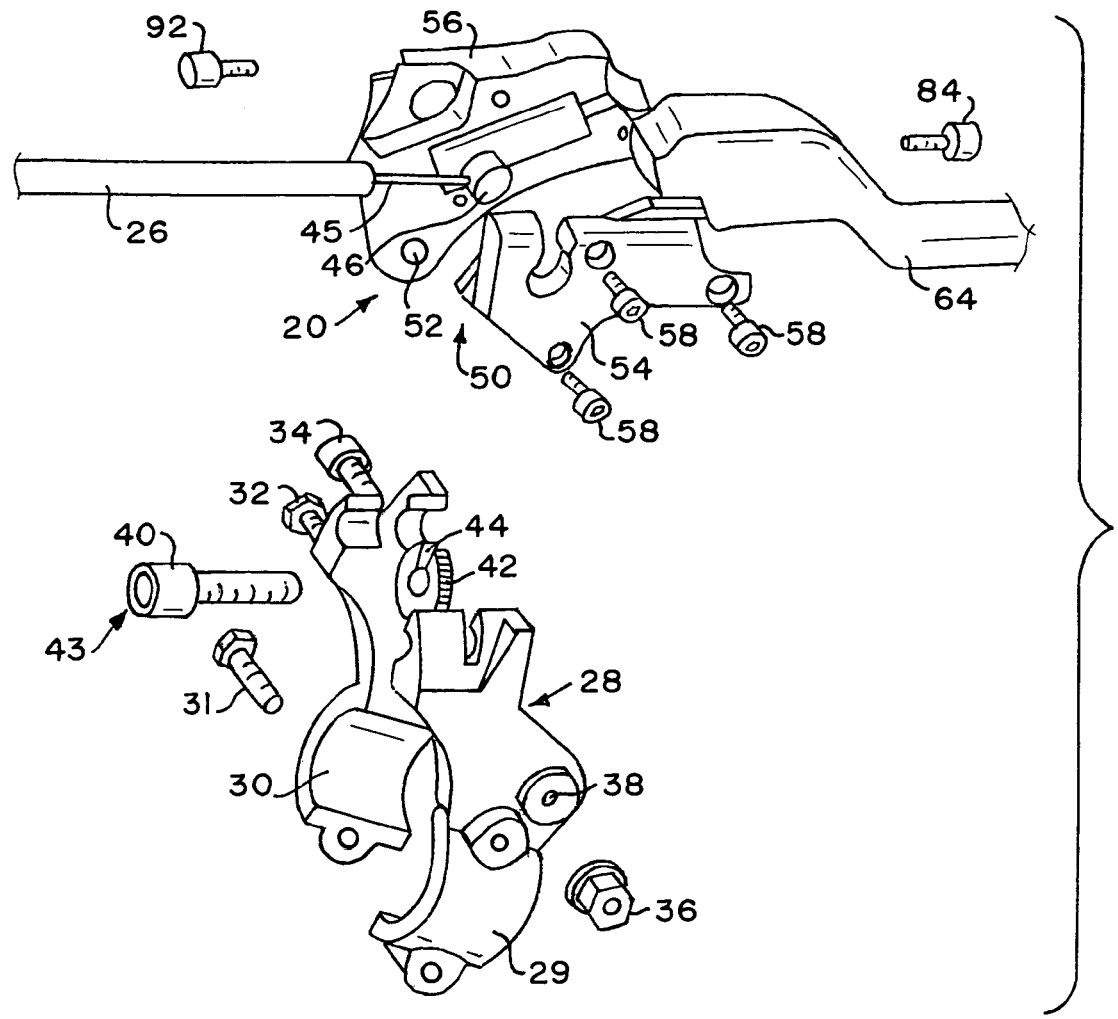
FIG. 9 is an exploded parts diagram of the present invention with the spring and cable assembly removed for clarity.
Figure 10:
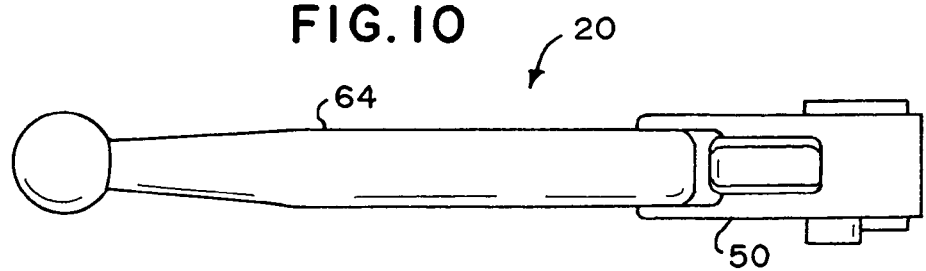
FIG. 10 is a top view of the present invention with the lever assembly not being disjointed.

Referring to FIGS. 1–3, the hand-operated jointed control lever assembly 20 of the present invention is shown mounted to a well-known cylindrical handlebar 22 of a vehicle (not shown) such as a motorcycle, an all-terrain vehicle ("ATV"), a bicycle, a water-powered jet ski, etc. The handlebar has a well-known grip 24 about one end thereof, and a well-known linkage, such as a cable linkage 26 or a rigid mechanical linkage (not shown) is operated as by reciprocation or in another manner well-known to those skilled in the art. Mounted to the handlebar is a well-known mounting bracket or so-called "perch" 28 (see also FIG. 9) having left and right halves 29, 30 that are clamped together by screws 31, 32 so as to entrap the handlebar 22 and fixedly mount the bracket 28 thereto in a manner well-known to those skilled in the art. Bracket 28 is provided with a pivot axis screw 34 and nut 36 that typically mount a control lever to the bracket 28 in a well-known manner for pivoting movement of a control lever about the pivot axis screw 34, which passes through a bore 38 in bracket 28.

Well-known cable linkage 26 preferably is received into a well-known linkage adjusting screw 40 that is axially threaded into a well-known knurled linkage adjusting nut 42 that can be turned to adjust "play" from the linkage in a manner well-known to those skilled in the art. Adjusting screw 40 and adjusting nut 42 preferably are longitudinally radially slotted (43 and 44, respectively) so as to permit them to be slipped over the cable 45 without having to remove the cable anchor 46 from the end of the cable 45.

Referring now to FIGS. 1 through 15, control lever assembly 20 comprises a lever body 50 mounted for pivoting movement, about pivot axis screw 34 passing through bore 52 in lever body 50, from a released position shown in FIGS. 1 and 2 to an actuated position shown in FIG. 3. Typically, control lever 20 will, when operated, actuate the clutch or brakes of the vehicle in a manner well-known to those skilled in the art. When the operator grips the control lever and moves it from the released position to the actuated position, the brakes will become actuated or the clutch will become disengaged in the usual manner through the linkage 26, depending on which is being controlled by the control lever 20.

Lever body 50 preferably is formed of left and right halves 54, 56 (see FIG. 9) that are secured together by a plurality of screws 58. Lever body 50 has arcuate rearward first fulcrum surface 60 and a rearwardly-extending lip 62 proximate first fulcrum surface 60.

Control lever assembly 20 further comprises a lever arm 64 having a forward edge portion 66 and an arcuate second fulcrum surface 68 proximate forward edge portion 66. As best seen in FIG. 4, first and second fulcrum surfaces 60, 68 are preferably respectively cylindrically concave and convex and are adapted for mating engagement when forward edge portion 66 is engaged under lip 62.

Control lever assembly 20 further comprises tensioning means 70 (see FIGS. 4 and 8) for applying a contraction force between first and second fulcrum surfaces 60, 68 that biases first and second fulcrum surfaces 60, 68 into mating engagement. Tensioning means 70 preferably comprises a tensioning cable 72 that passes through respective bores 74, 76 in first and second fulcrum surfaces 60, 68 (see FIGS. 6 and 7). Tensioning cable 72 has first and second ends 78, 80, with first end 78 having a hexagonal nut 82 crimped thereon into which tensioning adjustment screw 84 is threaded. Bore 76 is preferably hexagonal for receiving hexagonal nut 82 so that nut 82 is prevented from turning as adjustment screw 84 is turned. Tensioning cable 72 passes axially through a tensioning compression coil spring 86 and end 80 of tensioning cable 72 has a retaining head 88 crimped, welded or cast thereon so as to entrap spring 86 on cable 72. First end 78 of tensioning cable 72 is secured to lever arm 64 by inserting hexagonal nut 82 into bore 76 through second fulcrum surface 68 and then inserting screw 84 through the rearward end of bore 76 and threading screw 84 into hexagonal nut 82 as best seen in FIG. 4. Tensioning spring 86 is thus interposed between second end 80 of tensioning cable 72 and lever body 50, with tensioning spring 86 being received within a cylindrical cavity 90 formed within lever body 50.

With the exception of tension means 70, the components can be CNC machined from aluminum billet but are preferably cat or molded from aluminum alloy or suitable polymer. To assemble the control lever, the tensioning spring of tensioning means 70 is placed within cavity 90 as shown in FIG. 4, the first end 78 of tensioning cable 72 is secured to lever arm 64 as heretofore described, and the halves 54, 56 of lever body 50 are secured together by screws 58. The tensioning screw 84 can now be adjusted to tension the two fulcrum surfaces together. The control lever can then be mounted by pivot axis screw 34 to bracket 28 as heretofore described, and linkage 26 attached and adjusted in the usual manner.

It will be understood that the control lever assembly, now mounted, will operate as a unitary piece as long as it is gripped and moved between the positions shown in FIGS. 1, 2 and 3. However, it an accident occurs such that the vehicle falls, then the lever arm will become disjointed as shown in FIGS. 5 (disjointed outwardly) and 11 and 12 (disjointed sidewardly), with the tensioning cable 72 holding the lever arm to the lever body and permitting the disjointing with the forward edge portion 66 remaining engaged with the underside of lip 62 of lever body 50.

Figure 13:
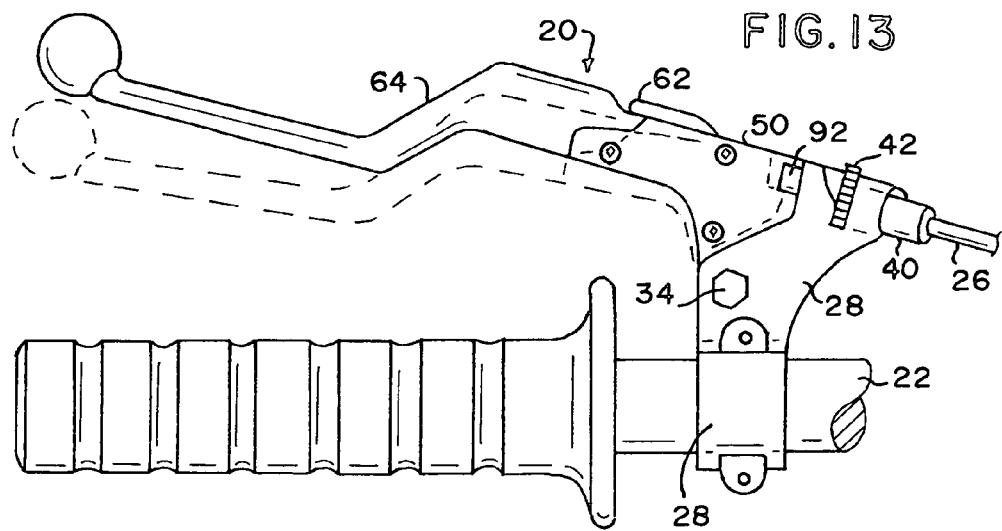
FIG. 13 is a side view of the present invention showing operation of the lever-to-perch angle adjustment screw.
Figure 14:
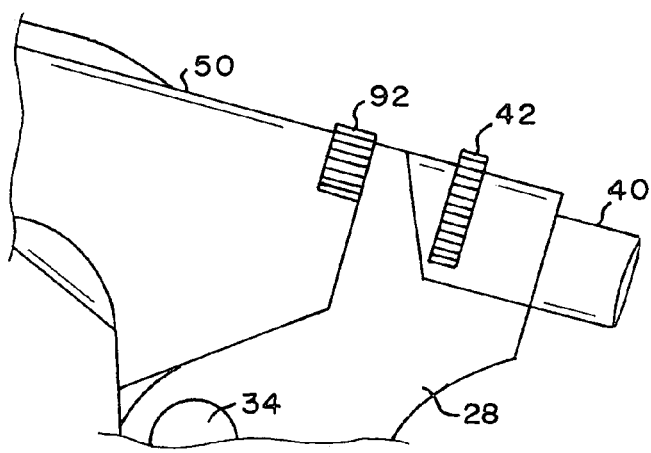
FIGS. 14 and 15 are partial views of FIG. 13, showing the lever-to-perch angle adjustment screw being used to adjust the lever-to-perch angle.
Figure 15:
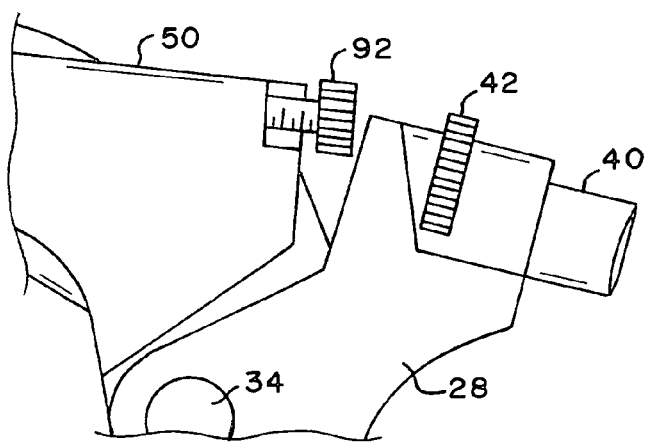

FIGS. 13, 14, and 15 show the details of the "perch adjustment screw" 92 that can adjust the angle of the control lever assembly 20 to the perch so as to vary the "reach distance" to the lever arm from the grip when the control lever assembly is in the released position. The perch adjustment screw 92 is threadedly received into the front of the lever body 50 and spaces the lever body from the bracket or perch 28 when in the released position.

Although the present invention has been described and illustrated with respect to a preferred embodiment and a preferred use therefor, it is not to be so limited since modifications and changes can be made therein which are within the full intended scope of the invention.

I claim:

1. A hand-operated jointed control lever assembly comprising:
   (a) a lever body mounted for pivoting movement about an axis from a released position to an actuated position; said lever body having a rearward first fulcrum surface and a rearwardly-extending lip proximate said first fulcrum surface;
   (b) a lever arm having a forward edge portion and a second fulcrum surface proximate said forward edge portion, said first fulcrum surface and said second fulcrum surface being adapted for mating engagement without a pivot axle jointing said lever arm to said lever body when said forward edge portion is engaged under said lip; and
   (c) tensioning means for applying a contraction force between said first fulcrum surface and said second fulcrum surface that biases said first and second fulcrum surfaces into mating engagement; said tensioning means comprising:
      i. a tensioning cable passing through said first and second fulcrum surfaces, said tensioning cable having a first end and a second end, said first end being secured to said lever arm; and
      ii. a compression coil spring interposed between said second end of said tensioning cable and said lever body, said compression coil spring being disposed within a cavity formed within said lever body with said tensioning cable passing axially through said coil spring.

2. A hand-operated jointed control lever assembly, said assembly comprising:
   (a) a lever body mounted for pivoting movement about an axis from a released position to an actuated position; said lever body having a rearward first fulcrum surface and a rearwardly-extending lip proximate said first fulcrum surface;
   (b) a lever arm having a forward edge portion and a second fulcrum surface proximate said forward edge portion, said first fulcrum surface and said second fulcrum surface being adapted for mating engagement without a pivot axle joining said lever arm to said lever body when said forward edge portion is engaged under said lip; said first and second fulcrum surfaces being respectively cylindrically concave and convex;
   (c) a tensioning cable passing through said first and said second fulcrum surfaces, said tensioning cable having a first end and a second end, said first end being secured to said lever arm; and
   (d) a compression coil spring interposed between said second end of said tensioning cable and said lever body, said compression coil spring being disposed within a cavity formed within said lever body with said tensioning cable passing axially through said coil spring.

* * * * *